(12) United States Patent
Kim et al.

(10) Patent No.: US 11,905,204 B2
(45) Date of Patent: Feb. 20, 2024

(54) COVER GLASS AND ELECTRONIC DEVICE WITH THE SAME AND METHOD FOR MANUFACTURING COVER GLASS

(71) Applicant: Samsung Electronics Co., Ltd., Gyeonggi-do (KR)

(72) Inventors: Wook-Tae Kim, Gyeonggi-do (KR); In-Gi Kim, Chungcheongnam-do (KR); Ji-Won Lee, Gyeonggi-do (KR); Chang-Soo Lee, Gyeonggi-do (KR); Hyung-jin Lee, Gyeonggi-do (KR); Gyu-Ha Jo, Seoul (KR); Yong-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 16/171,516

(22) Filed: Oct. 26, 2018

(65) Prior Publication Data
US 2019/0144332 A1   May 16, 2019

(30) Foreign Application Priority Data

Nov. 14, 2017   (KR) .......................... 10-2017-0151779

(51) Int. Cl.
*C03C 17/34*   (2006.01)
*C03C 17/30*   (2006.01)
(Continued)

(52) U.S. Cl.
CPC ............ *C03C 17/42* (2013.01); *C03C 17/002* (2013.01); *C03C 17/02* (2013.01); *C03C 17/25* (2013.01);
(Continued)

(58) Field of Classification Search
CPC . C03C 17/30; C03C 2217/213; C03C 17/002; C03C 17/02; C03C 17/25;
(Continued)

(56) References Cited

U.S. PATENT DOCUMENTS

2008/0138611 A1   6/2008   Yasuzawa et al.
2009/0258222 A1   10/2009  Roquiny et al.
(Continued)

FOREIGN PATENT DOCUMENTS

| CN | 101068755 A | 11/2007 |
|----|-------------|---------|
| CN | 105353539 A | 2/2016  |

(Continued)

OTHER PUBLICATIONS

English Language Translation of JP 2007-142155 (Year: 2007).*
(Continued)

*Primary Examiner* — Maria V Ewald
*Assistant Examiner* — Daniel P Dillon
(74) *Attorney, Agent, or Firm* — Cha & Reiter, LLC

(57) ABSTRACT

According to an embodiment, a cover glass includes a glass plate forming at least a portion of an electronic device, and a first coat layer deposited on a surface of the glass plate, the first coat layer at least partially including a network structure. The first coat layer includes silicon (Si), oxygen (O), and at least one impurity, and such that Si—O bonds are 80% or more by weight of the first coat layer. A polysilazane-applied coat is laid over one surface of the reinforced glass plate, providing an elegant haze glass cover.

17 Claims, 11 Drawing Sheets

(51) Int. Cl.
*C03C 17/42* (2006.01)
*C03C 17/00* (2006.01)
*C03C 17/25* (2006.01)
*C03C 17/02* (2006.01)
*G06F 3/041* (2006.01)

(52) U.S. Cl.
CPC .......... *C03C 17/30* (2013.01); *C03C 2203/52* (2013.01); *C03C 2204/08* (2013.01); *C03C 2217/213* (2013.01); *C03C 2217/285* (2013.01); *C03C 2217/77* (2013.01); *C03C 2217/78* (2013.01); *C03C 2218/112* (2013.01); *C03C 2218/32* (2013.01); *G06F 3/041* (2013.01)

(58) Field of Classification Search
CPC . C03C 17/42; C03C 2203/52; C03C 2204/08; C03C 2217/285; C03C 2217/77; C03C 2217/78; C03C 2218/112; C03C 2218/32; G06F 3/041; C23C 16/56; C04B 2235/483
See application file for complete search history.

(56) References Cited

U.S. PATENT DOCUMENTS

| | | | | |
|---|---|---|---|---|
| 2012/0156893 | A1* | 6/2012 | Ozaki | C04B 35/14 |
| | | | | 438/781 |
| 2014/0090864 | A1* | 4/2014 | Paulson | C03C 21/002 |
| | | | | 428/428 |
| 2014/0147680 | A1 | 5/2014 | Yamane et al. | |
| 2014/0220327 | A1* | 8/2014 | Adib | C03C 17/3435 |
| | | | | 428/217 |
| 2014/0246084 | A1* | 9/2014 | Okahata | C03C 17/23 |
| | | | | 136/256 |
| 2015/0004421 | A1* | 1/2015 | Fujiwara | C09D 183/16 |
| | | | | 428/447 |
| 2016/0236975 | A1 | 8/2016 | Sugimoto et al. | |
| 2018/0282201 | A1* | 10/2018 | Hancock, Jr. | C03C 15/00 |
| 2019/0119151 | A1* | 4/2019 | Kim | C03C 17/30 |
| 2019/0284091 | A1 | 9/2019 | Ikegami et al. | |

FOREIGN PATENT DOCUMENTS

| | | | |
|---|---|---|---|
| JP | 2004-137137 A | | 5/2004 |
| JP | 2007142155 A | * | 6/2007 |
| JP | 2017-132644 A | | 8/2017 |
| JP | 2017-137235 A | | 8/2017 |
| KR | 10-2012-0056289 A | | 6/2012 |
| KR | 10-1581272 B1 | | 1/2016 |
| KR | 10-2016-0061669 A | | 6/2016 |
| KR | 10-2016-0097106 A | | 8/2016 |
| WO | 2006-064918 A1 | | 6/2006 |
| WO | 2017-043538 A1 | | 3/2017 |
| WO | 2017/187173 A1 | | 11/2017 |
| WO | 2017/188477 A1 | | 11/2017 |

OTHER PUBLICATIONS

Nielson, et al.; "Large area, low cost anti-reflective coating for solar glasses"; Solar Energy Materials & Solar Cells; May 13, 2014; Elsevier.
International Search Report dated Apr. 1, 2019.
European Search Report dated Apr. 9, 2019.
Chinese Search Report dated Dec. 3, 2021.
Korean Office Action dated Jul. 28, 2022.

* cited by examiner

430

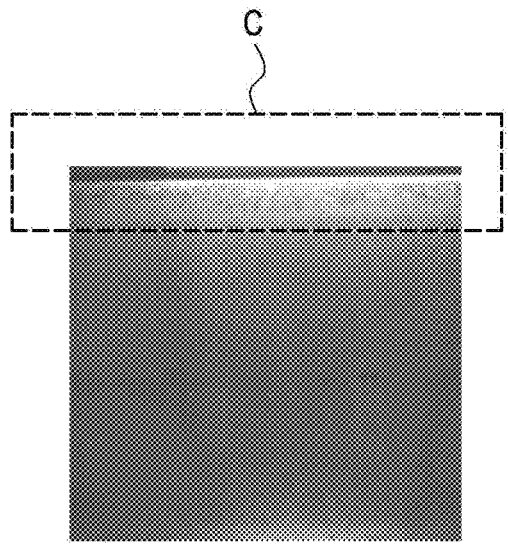
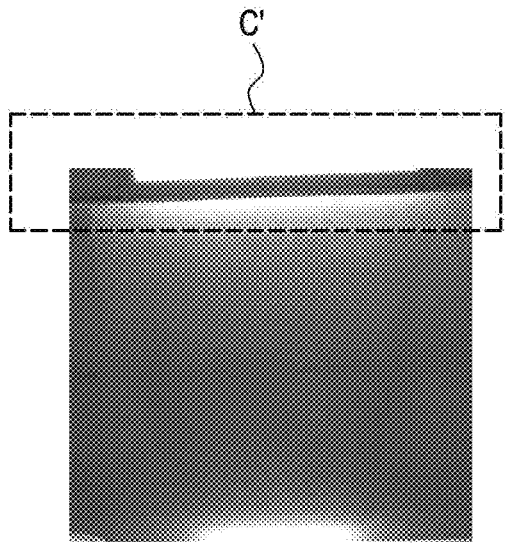
FIG.11A            FIG.11B
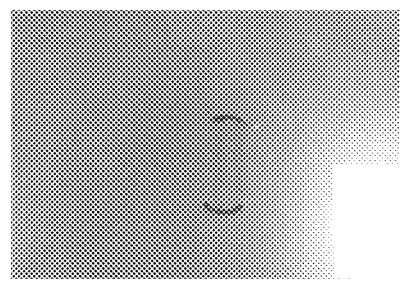
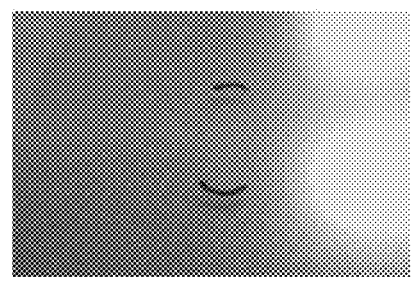
FIG.12A            FIG.12B

| Sample | AF on bare | Haze on bare | AS on bare | AS on Haze |
|---|---|---|---|---|
| Cross section | AF / glass | Haze / glass | AS / glass | AS / Haze / glass |
| Fingerprint visibility (when 10 oily fingerprints are applied) ΔE | 21.3 | 1.12 | 5.32 | 1.16 |
| Fingerprint wipability (wiped with 1.5kgf blue-jean cloth five times) ΔE | 18.07 | 0.54 | 8.51 | 0.22 |

FIG.13

COVER GLASS AND ELECTRONIC DEVICE WITH THE SAME AND METHOD FOR MANUFACTURING COVER GLASS

CROSS-REFERENCE TO RELATED APPLICATION(S)

This application is based on and claims priority under 35 U.S.C. § 119 to Korean Patent Application No. 10-2017-0151779, filed on Nov. 14, 2017, in the Korean Intellectual Property Office, the disclosure of which is herein incorporated by reference in its entirety.

BACKGROUND

1. Field

Various embodiments of the disclosure relate to cover glasses and electronic devices with the cover glasses, and methods for manufacturing cover glasses.

2. Description of Related Art

The term "electronic device" may mean a device that performs a particular function according to its equipped program, such as a home appliance, an electronic scheduler, a portable multimedia player, a mobile communication terminal, a tablet PC, a video/sound device, a desktop PC or laptop computer, a navigation system for automobiles, etc. For example, electronic devices may output stored information as voices or images. As electronic devices are highly integrated, and high-speed, high-volume wireless communication becomes commonplace, electronic devices, such as mobile communication terminals, have recently been equipped with various functions. For example, electronic devices come with the integrated functionality, including entertainment functions such as playing video games, multimedia functions such as replaying music/videos, communication and security functions for mobile banking, and scheduling or e-wallet functions.

The recent trend to stress the slimness and compactness of smartphones, laptop computers, or other electronic devices, has led to an attempt to adopt elegant glass parts as exterior materials for electronic devices. Further, various surface treatment techniques are being developed in order to give functional effects in addition to aesthetic effects.

Glass exterior materials, which are brittle in nature, require a chemical or physical enhancement in terms of, e.g., roughness and hardness. To that end, chemical etching and sand blasting have been practiced. In chemical etching, uneven patterns are formed on the surface through glass surface etching using hydrofluoric acid (HF) or $NH_4HF_2$. In sand blasting, patterns are formed by impacting the surface of glass with high-hardness particles. As an example, the exterior material can be realized by mixing oxide ($SiO_2$, $B_2O_3$, ZnO, etc.) particles with a solvent, followed by coating, and then a thermal treatment.

However, conventional chemical etching has disadvantages in that the HF or $NH_4HF_2$ used in the process are very toxic and dangerous, and thus their use is restricted. Further, forming protrusions and depressions by directly etching the glass surface may render further treatments difficult upon mass production. Sand blasting produces protrusions and depressions by forming tiny cuts in the glass surface by using energy that is generated when ceramic particles ("media") strike the surface. Sand blasting may result in an uneven, rough surface, together with reduced glass strength. Oxide ($SiO_2$, $B_2O_3$, ZnO, etc.) particle coating requires thermal treatment at 400° C. or more and may cause the strength to weaken as the stress of the reinforced glass is released.

The above information is presented as background information only to assist with an understanding of the disclosure. No determination has been made, and no assertion is made, as to whether any of the above might be applicable as prior art with regard to the disclosure.

SUMMARY

According to an embodiment, in a cover glass and an electronic device with the cover glass, a polysilazane-applied coat is laid over one surface of the reinforced glass plate, thereby providing an elegant haze glass cover.

According to an embodiment, in a cover glass and an electronic device with the cover glass, a polysilazane-applied coat may provide an anti-fingerprint effect by scattering light.

According to an embodiment, the method for manufacturing cover glasses may impart increased hardness and chemical-durability to the coat formed on the glass plate by multiple hardening processes under predetermined conditions.

According to an embodiment, a cover glass may include a glass plate forming at least a portion of an electronic device and a first coat layer disposed on the surface of the glass plate and, at least partially, forming a network structure, such that the first coat layer may include silicon (Si), oxygen (O), and at least one impurity, and such that Si—O bonds are 80 weight % or more of the first coat layer.

According to an embodiment, an electronic device may include a housing including a housing including a front cover facing in a first direction and a rear cover facing in a second direction which is opposite to the first direction, the housing having a transparent area forming at least part of the front cover, a battery disposed within the housing, a display device disposed within the housing and including a screen area exposed through the front cover, wherein the rear cover includes a glass plate, a first coat layer disposed on a surface of the glass plate, the first coat layer at least partially including a network structure, and a second coat layer disposed on a surface of the first coat layer and including a shape corresponding to the network structure of the first coat layer.

According to an embodiment, a method for manufacturing a cover glass of an electronic device includes preparing a glass plate, depositing a first coat layer on a surface of the prepared glass plate, the deposition including applying the first coat layer by wet spraying, and hardening the applied first coat layer at least twice, and depositing a second coat layer on a surface of the first coat layer.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, in which:

FIG. 11A and FIG. 11B are photos illustrating a comparison in vibrational anti-wear due to the example second hardening process performed on the first coat layer according to an embodiment;

FIG. 12A and FIG. 12B are photos illustrating results of a rubbing test using a reagent on an example cover glass with a second coat layer according to an embodiment; and FIG. 13 is a table showing the comparison in fingerprint visibility and fingerprint wipability before and after processing with the second coat layer.

Throughout the drawings, like reference numerals will be understood to refer to like parts, components, and structures.

DETAILED DESCRIPTION

Figure 1:
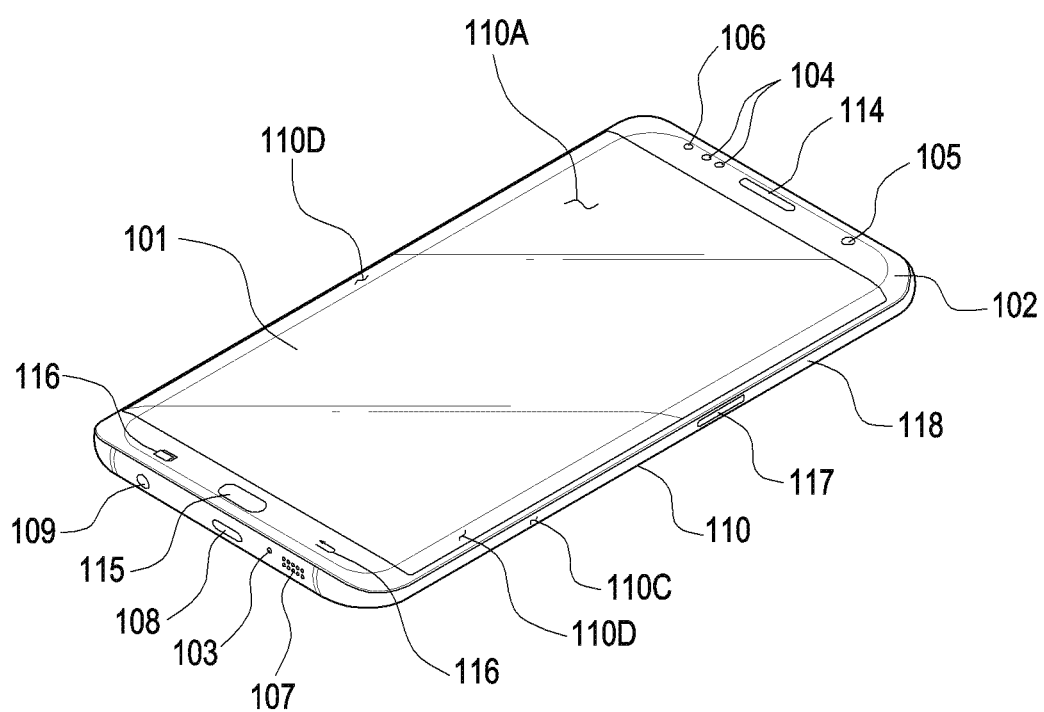
FIG. 1 is a front, perspective view illustrating an example electronic device according to an embodiment.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may use corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing one or more instructions that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 100) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (preintegration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added. Hereinafter, electronic devices are described with reference to the accompanying drawings, according to various embodiments of the disclosure. As used herein, the term "user" may denote a human or another device (e.g., an artificial intelligent electronic device) using the electronic device.

According to an embodiment, an exterior material using a glass substance may have various outer shapes depending on formation spaces. For example, the outer surface of the electronic device, which is prepared by performing surface treatment on one surface of the reinforced glass plate multiple times with coat layers, may present superior corrosion- and wear-resistance and haze thanks to dense oxide.

According to an embodiment, the exterior material using a glass substance provides a composition material and ratio for the cover. As another example, there is provided a method for manufacturing exterior materials using a glass substance. The coat layer deposited on the glass plate may enhance the joining strength by thermal treatment and allows for an exterior material with superior surface and mechanical characteristics.

According to an embodiment, an exterior material using a glass substance may be adopted for interior/exterior parts of portable electronic devices that need to be slim and strong. For example, an electronic device provided in the portable electronic device may be an electronic device having a display.

Figure 2:
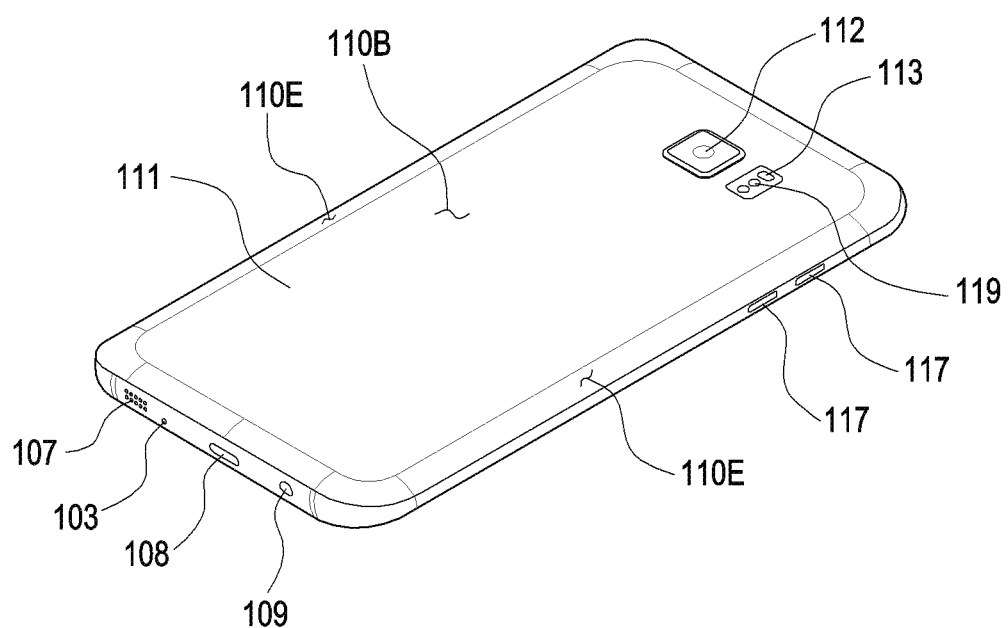
FIG. 2 is a rear, perspective view illustrating an example electronic device according to an embodiment.

FIG. 1 is a front, perspective view illustrating an electronic device according to an embodiment. FIG. 2 is a rear, perspective view illustrating an electronic device according to an embodiment.

Referring to FIGS. 1 and 2, according to an embodiment, an electronic device 100 may include a housing 110 with a first (or front) surface 110A, a second (or rear) surface 110B, and a side surface 110C surrounding a space between the first surface 110A and the second surface 110B. According to another embodiment (not shown), the housing may denote a structure forming part of the first surface 110A, the second surface 110B, and the side surface 110C of FIG. 1. According to an embodiment, the first surface 110A may be formed by a front plate 102 (e.g., a glass plate or polymer plate with various coat layers), at least part of which may be substantially transparent. The second surface 110B may be formed by a rear plate 111 that is substantially opaque. The rear plate 111 may be formed of, for example, laminated or colored glass, ceramic, polymer, metal (e.g., aluminum, stainless steel "STS", or magnesium), or a combination of at least two thereof. The side surface 110C may be formed by a side bezel structure (which is sometimes referred to as a "side member") 118 that couples to the front plate 102 and the rear plate 111, and further includes a metal and/or polymer. According to an embodiment, the rear plate 111 and the side bezel plate 118 may in some embodiments be integrally formed together, and include the same material (e.g., a metal, such as aluminum).

In the embodiment illustrated, the front plate 102 may include first regions 110D, which seamlessly and bendingly extend from the first surface 110A to the rear plate, on both the long edges of the front plate. In the embodiment (refer to FIG. 2) illustrated, the rear plate 111 may include second regions 110E, which seamlessly extends from the second surface 110B to the front plate (e.g., "bendingly" and/or with curvature), along both the long edges. According to an embodiment, the front plate or the rear plate may include either the first regions or second regions. According to an embodiment, the side bezel structure may have a first thickness (or width) for sides that do not have the first regions or the second regions; and a second thickness, which is smaller than the first thickness, for sides that have the first regions or the second regions.

According to an embodiment, the electronic device 100 may include at least one or more of a display 101, audio components 103, 107, and 114, sensor modules 104 and 119, camera components 105, 112, and 113, key input devices 115, 116, and 117, an indicator 106, and connector holes 108 and 109. According to an embodiment, the electronic device 100 may exclude at least one (e.g., the key input devices 115, 116, and 117 or the indicator 106) of the components or may add other components.

The display 101 may be exposed for viewing through the top of, e.g., the front plate 102. According to an embodiment, at least a portion of the display 101 may be exposed through the front plate 102 forming the first surface 110A and the first regions 110D of the side surface 110C. The display 101 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 104 and 119 and/or at least part of the key input devices 115, 116, and 117 may be disposed in the first regions 110D and/or the second regions 110E.

The audio components may include a microphone hole 103 and speaker holes 107 and 114. The microphone hole 103 may be operative coupled to a microphone inside so that the device can detect and record external sounds. According to an embodiment, a plurality of microphones may be included enabling detection of an originating direction of a sound. The speaker holes 107 and 114 may include an external speaker hole 107 and a phone receiver hole 114. According to an embodiment, the speaker holes 107 and 114 and the microphone hole 103 may be implemented as a single hole, or the speakers may be implemented without the speaker holes 107 and 114 (e.g., piezo speakers).

The sensor modules 104 and 119 may generate an electrical signal or data value corresponding to an internal operating state or external environmental state of the electronic device 100. The sensor modules 104 and 119 may include a first sensor module 104 such as a proximity sensor disposed on the first surface 110A of the housing 110, and/or a second sensor module (which is not shown) such as a fingerprint sensor, and/or a third sensor module 119 such as a heart-rate monitor "HRM" sensor disposed on the second surface 110B of the housing 110. The fingerprint sensor may be disposed on the second surface 110B as well as on the first surface 110A (e.g., the home key button 115) of the housing 110. The electronic device 100 may further include sensor modules that are not shown, such as at least one of a gestural input sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera components may include a first camera device 105 disposed on the first surface 110A of the electronic device 100, and a second camera device 112 and/or a flash 113 disposed on the second surface 110B. The camera components 105 and 112 may include one or more lenses, an image sensor, and/or an image signal processor. The flash 113 may include, e.g., a light emitting diode (LED) or a xenon lamp. According to an embodiment, two or more lenses (a wide-angle lens and a telescopic lens) and image sensors may be disposed on one surface of the electronic device 100.

The key input devices may include a home key button 115 disposed in the first surface 110A of the housing 110, a touchpad 116 disposed around the home key button 115, and/or a side key button 117 disposed on the side surface 110C of the housing 110. According to an embodiment, the electronic device 100 may exclude all or some of the above-mentioned key input devices 115, 116, and 117 and the excluded key input devices 115, 116, and 117 may be implemented in other forms, e.g., as soft keys on the display 101.

The indicator 106 may be disposed, e.g., on the first surface 110A of the housing 110. The indicator 106 may provide, e.g., state information about the electronic device 100 in the form of light and may include an LED.

The connector holes may include a first connector hole 108 for receiving a connector such as universal serial bus "USB" connector) for transmitting or receiving power and/or data to/from an external electronic device, and/or a second connector hole 109 such as an earphone jack for receiving a connector for transmitting or receiving audio signals to/from the external electronic device.

Figure 3:
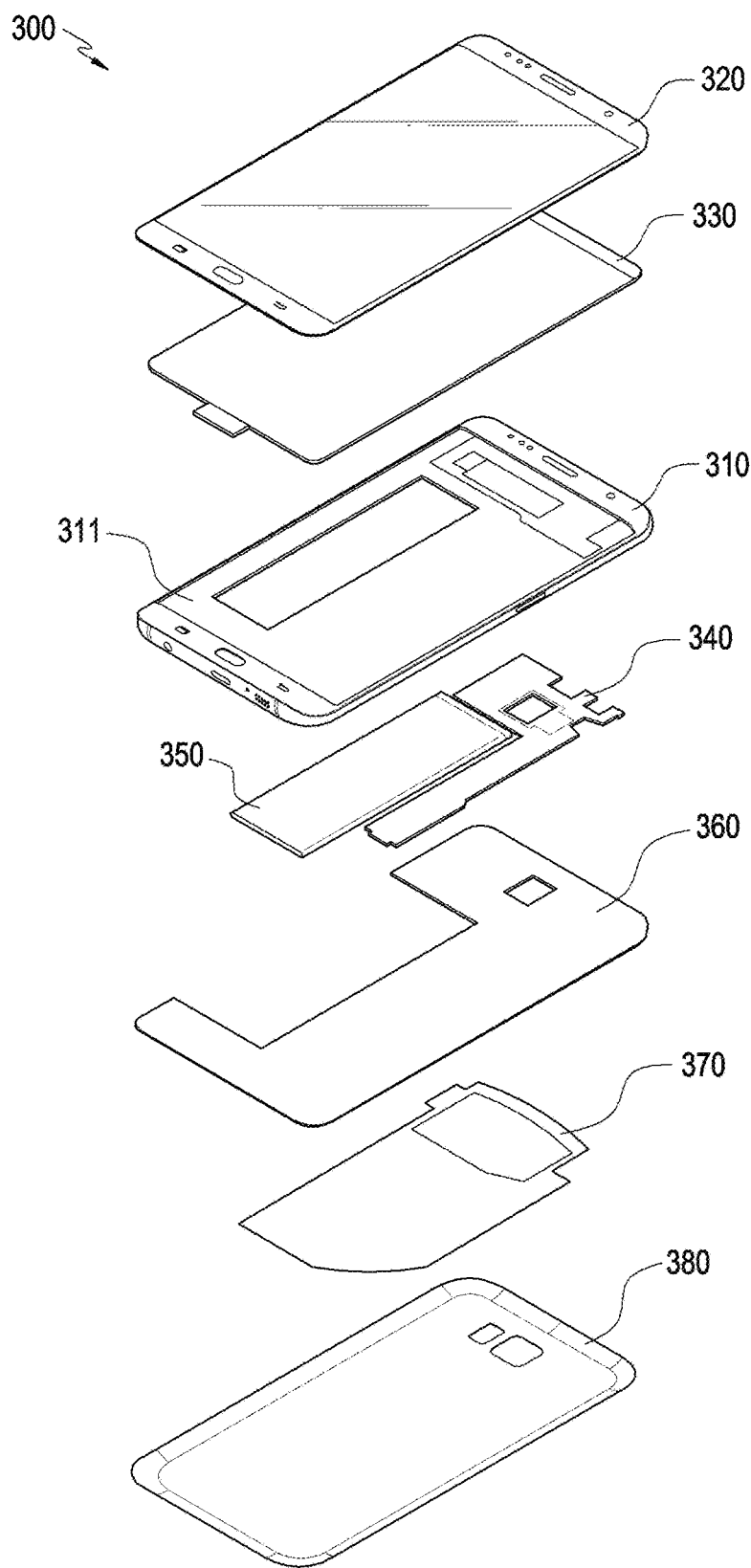
FIG. 3 is an exploded perspective view illustrating the example electronic device of FIG. 1 according to an embodiment.

FIG. 3 is an exploded perspective view illustrating the electronic device of FIG. 1 according to an embodiment.

Referring to FIG. 3, an electronic device 300 may include a side bezel structure 310, a first supporting member 311 (e.g., a support bracket), a front plate 320, a display 330, a printed circuit board 340, a battery 350, a second supporting member 360 (e.g., a rear casing), an antenna 370, and a rear plate 380. According to an embodiment, the electronic device 300 may exclude at least one or more of the components (e.g., the first supporting member 311 or second supporting member 360) or may add other components. At least one of the components of the electronic device 300 may be the same or similar to at least one of the components of the electronic device 100 of FIG. 2. Accordingly, any duplicate descriptions of the same will be omitted below.

The first supporting member 311 may be disposed within the electronic device 300 and connected with or integrated with the side bezel structure 310. The first supporting member 311 may be formed of materials such as a metal and/or non-metallic material (e.g., polymer). The display 330 may be coupled, affixed to or otherwise joined onto one surface of the first supporting member 311, and the printed circuit board 340 may be coupled, affixed to or otherwise joined onto the opposite surface of the first supporting member 311. Computing components such as a processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically couple to or physically connect the electronic device 300 with an external electronic device, and may include a USB connector, an SD card/multi media card (MMC) connector, or an audio connector.

The battery 350 may be provided for supplying power to at least one component of the electronic device 300. The battery 189 may include, for example, a primary cell which is not rechargeable, a secondary cell which is rechargeable, or a fuel cell. At least a portion of the battery 350 may be disposed on or aligned with and arranged substantially the same plane as the printed circuit board 340. The battery 350 may be integrated with (e.g., non-detachable) or detachably disposed inside the electronic device 100.

The antenna 370 may be disposed between the rear plate 380 and the battery 350. The antenna 370 may include, for example, a near-field communication (NFC) antenna, a wireless charging antenna, and/or a magnetic secure transmission (MST) antenna. The antenna 370 may perform short-range communication with, for example, an external device, or may wirelessly transmit or receive power utilized for charging a battery. According to an embodiment, an antenna structure may be formed by a portion or combination of the side bezel structure 310 and/or the first supporting member 311.

Figure 4:
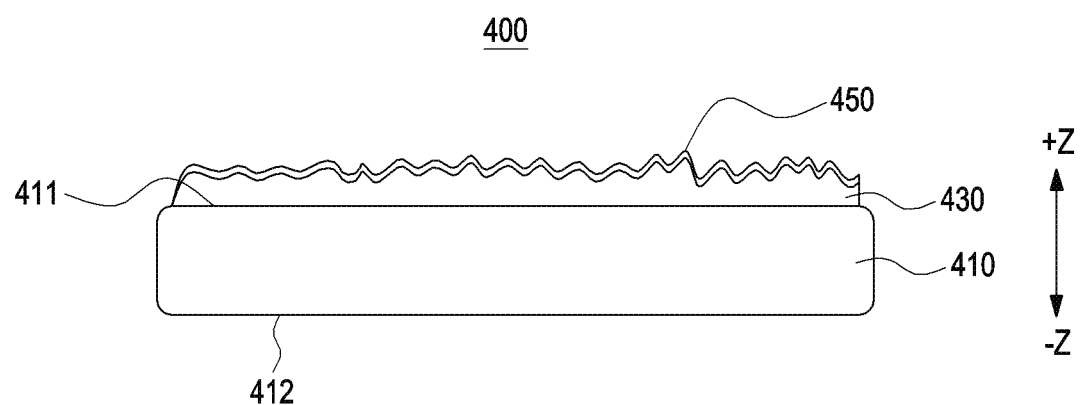
FIG. 4 is a cross-sectional view illustrating a portion of an example cover glass 400 according to an embodiment.

FIG. 4 is a cross-sectional view illustrating a portion of a cover glass 400 according to an embodiment.

Referring to FIG. 4, the cover glass 400 may include a glass plate 410, a first coat layer 430 laminated on one surface of the glass plate 410, and a second coat layer 450 laminated on one surface of the first coat layer 430. The cover glass 400 of FIG. 2 may be the same, in whole or part, as the housing 110 of FIGS. 1 and 2.

According to an embodiment, an electronic device, e.g., a mobile device, may include the glass plate 410. The glass plate 410 may include a first surface 411 which is oriented towards a first direction +Z, a second surface 412 oriented towards a second direction −Z which is opposite to the first direction +Z, and a side surface oriented towards a third direction which is perpendicular to the first direction +Z. The glass plate 410 may be the rear cover and/or bezel region that substantially forms the non-active region of the electronic device.

According to an embodiment, the first coat layer 430 may be deposited on the glass plate 410. For example, the first coat layer 430 may be formed by depositing inorganic polysilazane on at least one surface of the glass plate 410, which then chemically changes into $SiO_2$ via hydrolysis and/or a water condensation reaction. The thickness of the first coat layer 430 may be relatively small compared to the thickness of the glass plate 410.

According to an embodiment, the first coat layer 430 may at least partially form a network structure that may include multiple protrusion-and-depression shapes. The network structure may produce on a substantially "hazy state" effect on the cover glass 400 with the glass plate 410 placed in the second direction −Z The "hazy state" indicates a cloudy or semi-transparent state which the user cannot see clearly see through, and may mean a state in the middle of changing from transparent to opaque depending on the haze %.

According to an embodiment, the second coat layer 450 may be deposited on one surface of the first coat layer 430. The second coat layer 450 may be prepared in a structure corresponding to the protrusion-and-depression shapes of the first coat layer 430 and may form the outer surface of the cover glass 400. The second coat layer 450 may be implemented as a barrier coat layer in order to enhance slip and chemical-resistant characteristics on the outer surface of the cover glass 400.

According to an embodiment, the thickness of the second coat layer 450 may be relatively small compared to the thickness of the first coat layer 430. As another example, the second coat layer 450 may be formed of a transparent material in order to not disturb the hazy state of the first coat layer 430.

The first coat layer 430 and the second coat layer 450 are described below in detail.

Figure 5:
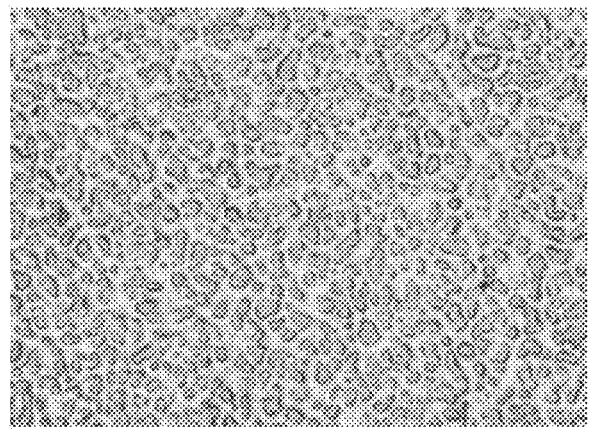
FIG. 5 is a photo illustrating a magnified portion of an example outer surface of a first coat layer 430 according to an embodiment.
Figure 6:
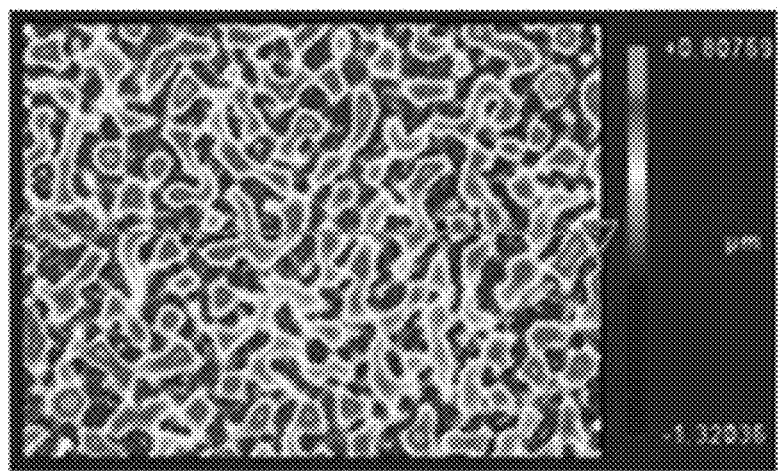
FIG. 6 is a photo illustrating the example portion of the first coat layer 430 of FIG. 3 in a 2D height map.
Figure 7:
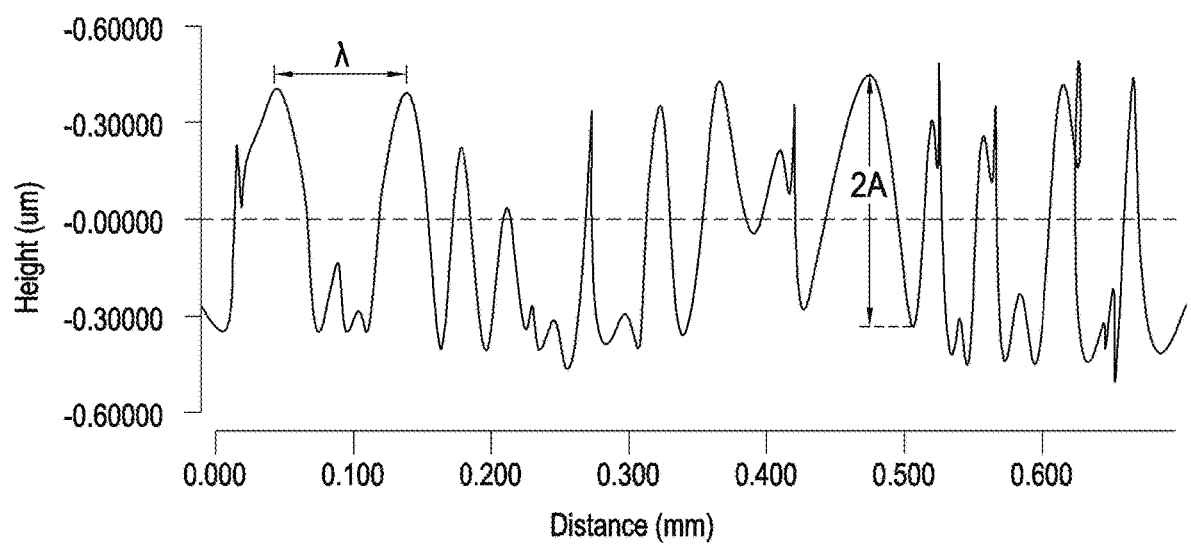
FIG. 7 is a photo illustrating, in a line profile, the height 2A and the pitch of the protrusion-and-depression shape in a cross section of the example first coat layer 430 according to an embodiment.

FIG. 5 is a photo illustrating a magnified portion of an outer surface of a first coat layer 430, according to an embodiment. FIG. 6 is a photo illustrating a portion of the first coat layer 430 of FIG. 5 in a 2D height map. FIG. 7 is a photo illustrating, in a line profile, the height 2A and the pitch of the protrusion-and-depression shape in a cross section of the first coat layer 430, according to an embodiment.

Referring to FIGS. 5 to 7, the cover glass (e.g., the cover glass 400 of FIG. 4) may include a glass plate (e.g., the glass plate 410 of FIG. 4), and a first coat layer 430 laminated on one surface of the glass plate. The configuration of the glass plate and the first coat layer 430 of FIGS. 5 to 7 may be the same, in whole or part, as the configuration of the glass plate 410 and the first coat layer 430 of FIG. 4.

According to an embodiment, the first coat layer 430 may at least partially include a network structure with multiple protrusion-and-depression shapes, and the protrusion-and-depression shapes may be formed via at least one hardening process after inorganic polysilazane is coated on the glass plate. The protrusion-and-depression shapes may be prepared in an uneven network shape or a three-dimensional (3D) network pattern.

Referring to FIGS. 6 and 7, the plurality of protrusion-and-depression shapes in the network structure of the first coat layer 430 have different heights and/or pitches, but may be produced to overall be within a predetermined height range "2A" (as seen in FIG. 7) and/or pitch range. For example, the average of the pitches "λ" of the protrusion-and-depression shapes along the lengthwise direction at cross-section view of the network structure may be within a range of about 20 μm to about 60 μm. As another example, the average of the heights 2A of the protrusion-and-depression shapes along the direction perpendicular to the lengthwise direction may be within a range of about 0.5 μm to about 0.9 μm. As another example, the ratio "A/λ" of height A to pitch λ for the protrusion-and-depression shapes may be within a range of 0.004 to 0.015.

According to an embodiment, the protrusion-and-depression shapes of the first coat layer 430 may provide surface roughness on the cover glass. For example, the surface roughness "Ra" formed by the protrusion-and-depression shapes of the first coat layer 430 may be within a range of about 100 nm to about 300 nm. As another example, the root mean square "RMS" roughness formed by the protrusion-and-depression shapes of the first coat layer 430 may be within a range of about 130 nm to about 400 nm.

According to an embodiment, the degree of haze provided on the cover glass coated with the first coat layer 430 may be within a range of about 5% to about 35%, as measured by a transparent haze meter (such as those commercially available from Nippon Denshoku Company, LTD). As another example, the degree of haze of the cover glass coated with the first coat layer 430 may be within a range of about 5% to about 25% (as measured by the transparent haze meter.

Figure 8A:
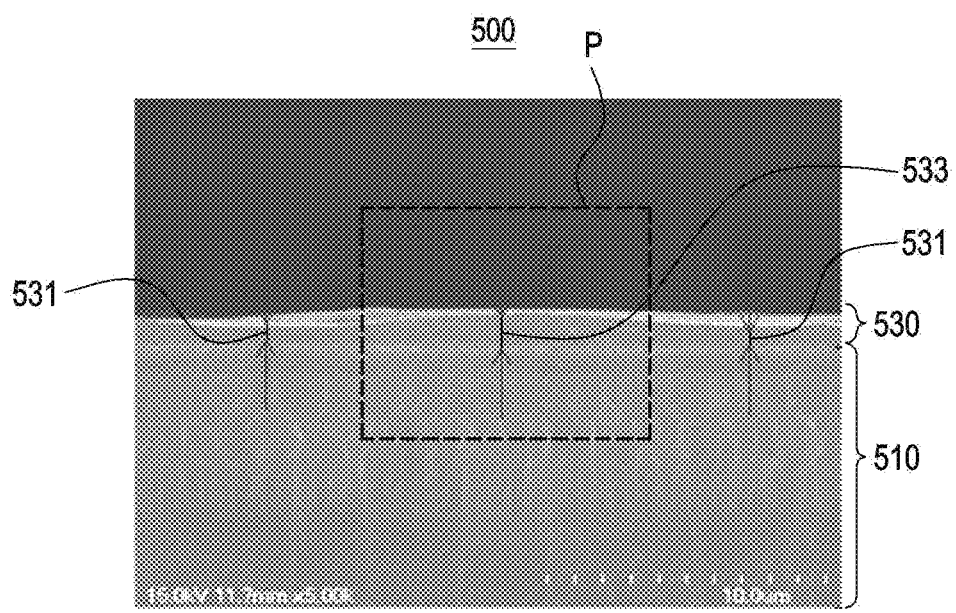
FIG. 8A is a photo illustrating an arrangement relationship between an example first coat layer 530 and a glass plate 510 of a cover glass 500 as magnified by an experimental device according to an embodiment.
Figure 8B:
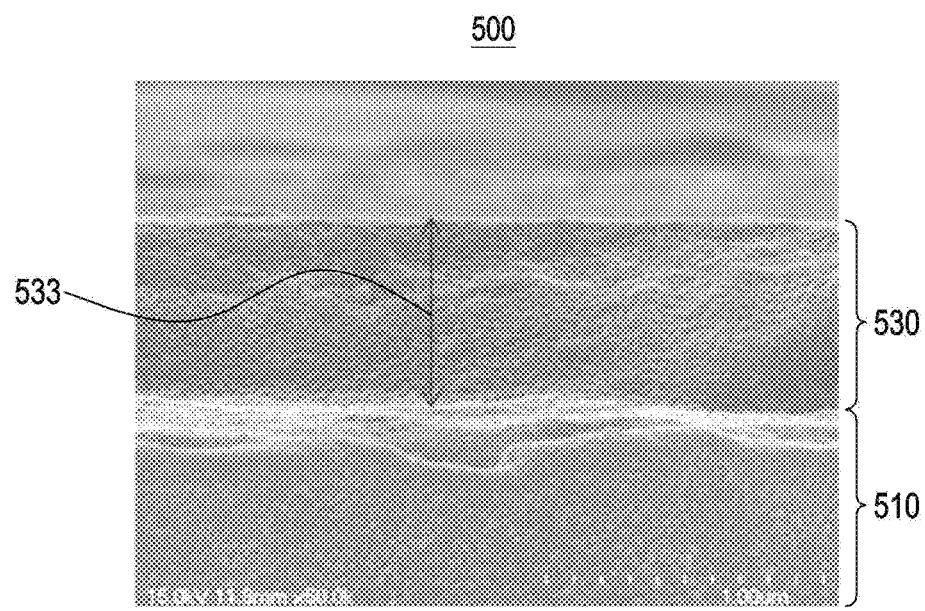
FIG. 8B is a photo illustrating an example portion P of FIG. 8A as further magnified.

FIG. 8A is a photo illustrating the arrangement relationship between a first coat layer 530 and a glass plate 510 of a cover glass 500, as magnified by an experimental device according to an embodiment. FIG. 8B is a photo illustrating a portion P of FIG. 8A as further magnified.

Referring to FIGS. 8A and 8B, the cover glass 500 may include a glass plate 510 and a first coat layer 530 laminated on one surface of the glass plate 510. The configuration of the glass plate 510 and the first coat layer 530 of FIGS. 8A and 8B may be the same, in whole or part, as the configuration of the glass plate 410 and the first coat layer 430 of FIG. 4.

According to an embodiment, the first coat layer 430 may have a network structure with multiple protrusion-and-depression shapes that may have valley portions 531 which have relatively smaller thicknesses from the surface meeting the glass plate 510, when compared to other thicknesses and peak portions 533, which have relatively larger thicknesses from the surface meeting the glass plate 510 when compared to other thicknesses. The first coat layer 430 with the valley portions 531 and the peak portions 533 have predetermined thicknesses, e.g., about 300 nm to about 600 nm for the valley portions 531 and about 0.6 μm to 2 μm for the peak portions 533.

The thicknesses of the valley portions 531 and the peak portions 533 may be implemented by the first coat layer 530 formation process described below. At thicknesses over the above-suggested coat layer thicknesses, the degree of haze and the durability of the coat may be lowered, resulting in a higher chance of cracking.

Processes for the first coat layer 430 and the second coat layer 450 are described below.

Figure 9:
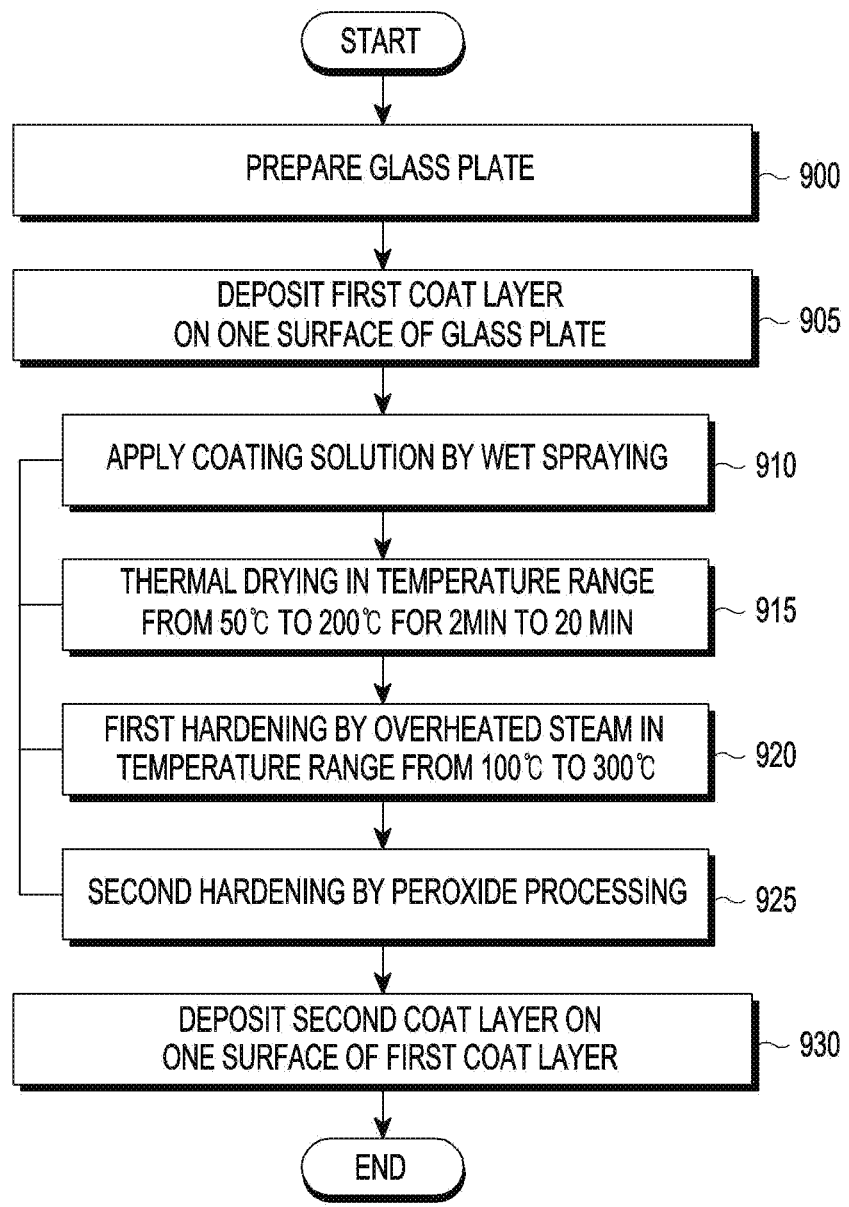
FIG. 9 is a flowchart illustrating an example method for manufacturing a cover glass with a first coat layer and a second coat layer deposited on a glass plate according to an embodiment.

FIG. 9 is a flowchart illustrating a method for manufacturing a cover glass with a first coat layer and a second coat layer deposited on a glass plate according to an embodiment.

Referring to FIG. 9, the cover glass may include a glass plate, a first coat layer laminated on one surface of the glass plate, and a second coat layer laminated on one surface of the first coat layer. The configuration of the glass plate, first coat layer, and second coat layer of the cover glass of FIG. 9 may be the same, in whole or part, as the configuration of the glass plate 410, first coat layer 430 or 530 and second coat layer 450 of the cover glass 400 of FIGS. 4 to 8.

According to an embodiment, as per step 900, the glass plate used in the cover glass of the electronic device may be prepared (e.g., manufactured). The glass plate may be formed of reinforced glass. For example, the glass plate may be formed of a hard material that is transparent or in other various colors and may be utilized as an exterior material for the electronic device.

After the glass plate is prepared, a first coat layer may be deposited on one surface of the glass plate as per step 905. The process of forming the first coat layer may include the process of applying a coat solution (910), the process of thermally drying (915), a first hardening process (920), and a second hardening process (925).

According to an embodiment, the haze coating process (910) may be performed as a wet coating process using an inorganic polysilazane-containing solution on the reinforced glass plate.

According to an embodiment, the polysilazane used in the haze coating process (910) may be inorganic polysilazane with the following chemical formula 1:

[Chemical formula 1]

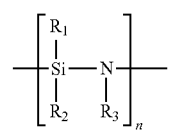

In the above chemical formula, the inorganic polysilazane has a weight-average molecular weight ranging from about 2,000 to about 30,000, and 1 to 30 weight % of it is dissolved in a solvent with no hardening agent added.

In the above chemical formula, R1, R2, and R3 are independently hydrogen, an alkyl group, an alkenyl group, a cycloalkyl group, an aryl group, a group attached to silicon, an alkylsilyl group, an alkylamino group, and an alkoxy group, and n is a positive integer.

According to an embodiment, in the haze coating process (910), inorganic polysilazane may be applied in a wet spray scheme to produce the haze state. For example, the weight % ratio of polysilazane to solvent in the coating solution provided by wet spraying may be 5:95 to 20:80, and the percentage at which the coating solution arrives at one surface of the glass plate may be 40%. As another example, the percentage at which the coating solution arrives at the one surface of the glass plate may be 30% or less.

According to an embodiment, after the coating solution application process (910), a thermal drying process (915) may be performed. The thermal drying process (915) may include removing the solvent from the coating solution. In this process 23, thermal drying may be performed for 2 min. to 20 min. at about 50° C. to 200° C. in order to remove the solvent from the coating solution.

According to an embodiment, after the thermal drying process (915), the first hardening process (920) may be performed. For example, the first hardening process (920) may include a superheated steam-hardening process in which the coat layer may be hardened in a temperature range of about 100° C. to about 300° C.

According to an embodiment, the thermal drying process (915) may transform the inorganic polysilazane into an $SiO_2$ film, the process of which is shown in Chemical Formula 2 below.

[Chemical formula 2]

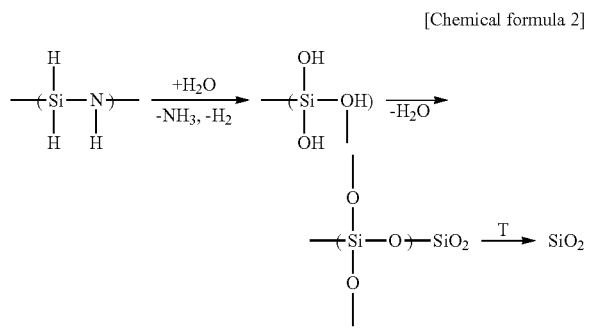

According to an embodiment, for the first hardening reaction of Chemical Formula 2 to apply to the glass plate efficiently, the temperature setting needs to be such that the reinforced stress among the chemical components of the glass plate is not released. Thus, the process may be performed in a temperature range of about 100° C. to 300° C. For example, when hardening, i.e., reinforcing, the process is performed at 400° C. or higher after the coating solution application process (915) is performed on the glass plate, and irregular reinforcing may significantly warp the glass plate, thus causing damage or defects.

According to an embodiment, after the first hardening process (920), the second hardening process (925) may be performed. For example, the second hardening process (925) may be a peroxide hardening process that may be performed at a temperature relatively lower than the temperature of the first hardening process (920).

Figure 10:
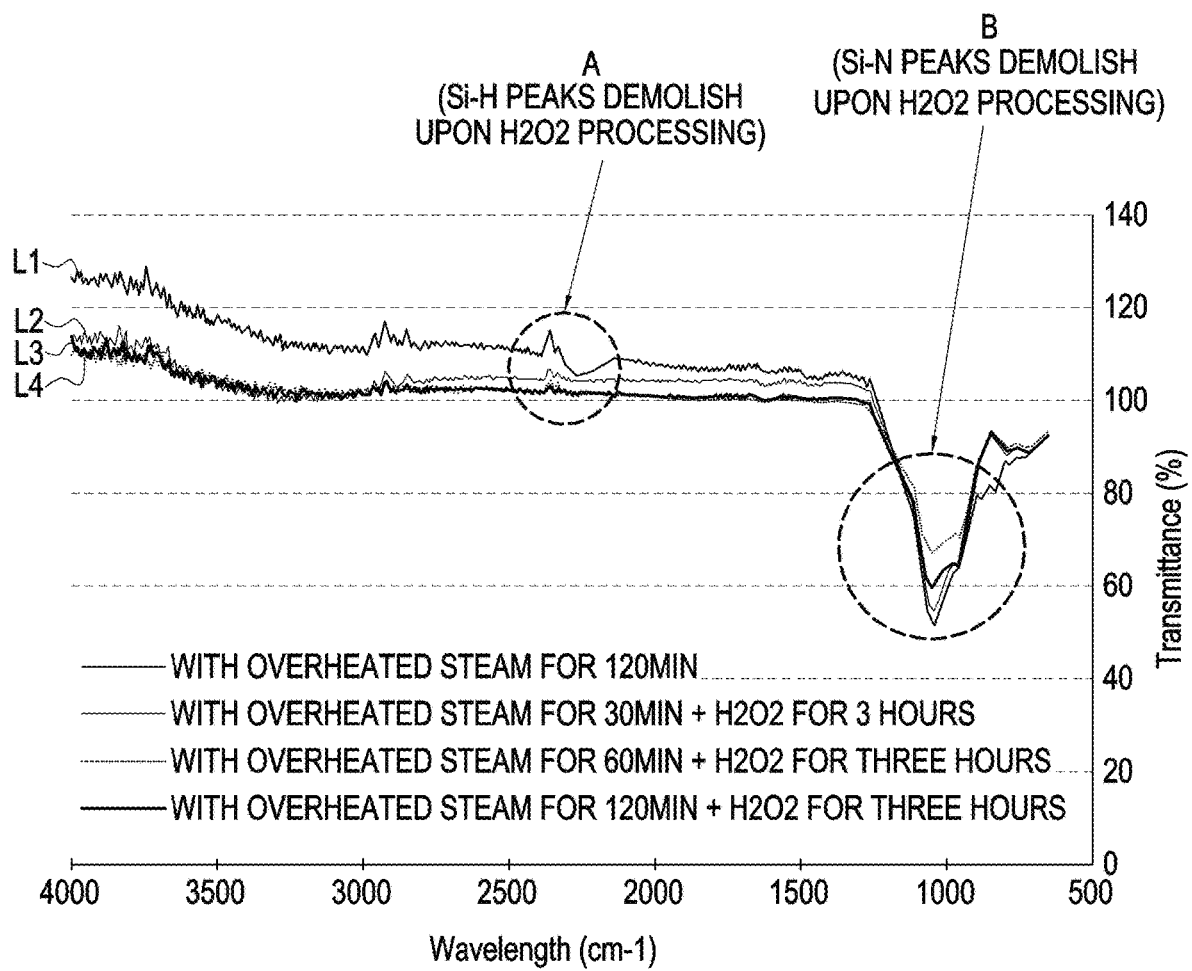
FIG. 10 is a graph illustrating an FT-IR measurement result by an example second hardening process performed on a first coat layer according to an embodiment.

FIG. 10 is a graph illustrating an Fourier-Transform Infrared Spectroscopy "FT-IR" measurement result of a second hardening process (925) performed on a first coat layer according to an embodiment. FIGS. 11A and 11B are photos illustrating a comparison in vibrational anti-wear due to the second hardening process (925) performed on the first coat layer according to an embodiment. FIG. 11B is a photo of the case where the second hardening process has not yet been performed and FIG. 11B is a photo of the case where the second hardening process has been performed.

Referring to FIGS. 9 and 10, the second hardening process (925) may be performed to reinforce the chemical bonds that have not fully been made into the $SiO_2$ film in the first hardening process (920). For example, the second hardening process (925) may be the process for breaking down any remaining Si—N or Si—H bonds in the first hardening process (920), hence generating complete Si—O—Si bonds, and the second hardening process may be performed to allow the first coat layer to overall transform into the $SiO_2$ film.

According to an embodiment, the second hardening process (925) may be performed in a temperature range of about 30° C. to about 200° C. For example, the second hardening process (925) may be performed in a temperature range of about 30° C. to about 100° C. The second hardening process (925) may further increase the hardness of the first coat layer that has undergone the first hardening process (920).

The graph of FIG. 10 shows the results of an analysis of the characteristics of the material via the "FT-IR" spectroscopy. L1 denotes the results obtained by performing the first hardening process for about 120 min., and L2 denotes the results obtained by performing the first hardening process for about 30 min., followed by the second hardening process for 3 hours. L3 denotes the results obtained by performing the first hardening process for about 60 min., followed by the second hardening process for about 3 hours, and L4 denotes the result obtained by performing the first hardening process for about 120 min., followed by the second hardening process for 3 hours.

It can be verified from the graph that performing the second hardening process after the first hardening process results in a better effect for transforming the first coat layer into the $SiO_2$ film. For example, it can be verified that performing the first hardening process alone for two hours leaves the regions "A" with Si—H bonds and the region "B" with Si—N bonds. However, it can be verified that adding the second hardening process fully removes regions A and B, even when the first hardening process is performed for 30 min.

Referring to the photos of FIGS. 11A and 11B, as well as table 1 below, the effect of enhancing the durability of the first coat layer by the second hardening process may be verified from the results of hardness comparison and vibrational wear-resistant test.

FIG. 11A illustrates a the sample on which peroxide hardening has not been performed, as the second hardening process is not performed, and reveals that the upper coat C peels off under a given test condition (3000 rpm/30 min in an abrasive environment). In contrast, referring to FIG. 11B, it can be verified that the sample, which has undergone peroxide hardening-processing by the second hardening process, causes no peeling off of the upper coat C' under the same test conditions. Thus, the first coat layer, which has undergone the second hardening process, may have an improved degree of durability.

Table 1 shows the comparison in hardness depending on whether the second hardening process is performed or not.

TABLE 1

| Sample numbers | Peroxide-processed [MPa] | Not peroxide-processed [MPa] |
|---|---|---|
| 1 | 2329.2 | 1364.9 |
| 2 | 2286.4 | 1301.6 |
| 3 | 2349.0 | 1314.3 |
| 4 | 2216.0 | 1309.9 |

TABLE 1-continued

| Sample numbers | Peroxide-processed [MPa] | Not peroxide-processed [MPa] |
|---|---|---|
| 5 | 2322.0 | 1336.6 |
| 6 | 2401.6 | 1318.5 |
| average | 2317.4 | 1324.3 |

The samples numbering 1 to 6 for hardness were specially prepared by bar coating to have no surface protrusion-and-depression for nanoindentation, and the measurement conditions applied include use of a Berkovich indenter, about 150 nm of press-fitting depth for samples not peroxide-processed, and about 100 nm for peroxide-processed samples.

Regarding Table 1 above, for six samples in total, the samples which have not been peroxide-processed due to not performing the second hardening process, were measured for hardness, and the same samples were then measured for hardness after they have been peroxide-processed by the second hardening process.

It can be verified that the samples (numbers 1 to 6) that were not subjected to the second hardening process show 1324 Mpa on average, and the samples (numbers 1 to 6) that were subjected to the second hardening process show a superior 2317 MPa on average. Accordingly, the second hardening process increases the surface hardness of the first coat layer by a factor of about 1.7.

The surface hardness may present a value meeting the durability of the coat, along with a haze percentage when the thickness of the $SiO_2$ film, which is finally formed by second hardening after the solvent is fully removed in the drying process, is within the above-described range (e.g., referring to FIGS. 8A and 8B, the valley portions have a thickness range of 300 nm to 600 nm from the surface contacting the glass plate, and the peak portions have a thickness range of 0.6 μm to 2 μm).

FIGS. 12A and 12B are photos illustrating results of a rubbing test using a reagent on a cover glass with a second coat layer according to an embodiment. FIG. 12A is a photo representing a case in which no second coat layer has been deposited, and FIG. 12B is a photo representing a case in which a second coat layer has been deposited.

Referring to FIGS. 9, 12A, and 12B, after the first coat layer 430 is formed as per process 20, the second coat layer 450 may be deposited on one surface of the first coat layer 430. The process of forming the second coat layer 450 may be performed to generate an anti-fingerprint coating with a fluorine-based compound or hydrocarbon-based material, in order to enhance chemical-resistance and anti-fingerprint characteristics, and the cover glass may thereby include reduced fingerprint visibility due to the second coat layer.

According to an embodiment, coating with the second coat layer may impart better chemical-resistance to the first coat layer (e.g., the $SiO_2$ film), thereby making it more resistant to ethanol or other alcohols. As another example, the second coat layer has a carbon fluoride chain or hydrocarbon chain as a functional group, thereby providing anti-fingerprint or other anti-contamination functionalities.

The effects experimentally obtained from the second coat layer are described below. FIG. 13 below shows the comparison in fingerprint visibility and fingerprint wipability between before and after processing with the second coat layer.

Referring to FIG. 13, comparison examples 1 to 3 are compared in configuration with an embodiment of the disclosure.

AF denotes a coat with relatively low surface energy (e.g., 115 degrees or less of the contact angle of water) due to anti-fingerprint coating, and AS denotes a coat with relatively high surface energy (e.g., 70 degrees or less of the contact angle of water) due to anti-smudge coating. Bare denotes a reinforced glass not subjected to processing (e.g., a glass plate with 10 degrees or less of the contact angle of water when washed), and Haze denotes a polysilazane surface to which the first coat layer has been applied according to an embodiment.

The visibility and wipability for fingerprints or other foreign bodies can be identified as numerical values by Equation 1 below.

$$\Delta E^*_{ab} = \sqrt{(L^*_2-L^*_1)^2+(a^*_2-a^*_1)^2+(b^*_2-b^*_1)^2}$$ [Equation 1]

Under a pin light, ΔE represents the color difference determined as a reference by the International Commission on Illumination, which represents the difference between before and after processing. For example, $L^*_1$ represents the brightness value before being fingerprint-processed with the coat layer, $L^*_2$ the brightness value after being fingerprint-processed, $a^*_1$ the color value before being processed with the coat layer, $a^*_2$ the color value after being processed with the coat layer, $b^*_1$ the chroma value before being processed with the coat layer, and $b^*_2$ the chroma value after being processed with the coat layer.

According to an embodiment, fingerprint visibility represents the mean value resulting from applying 10 or more oily fingerprints, and fingerprint wipability represents the mean value resulting from wiping with a 1.5 kgf cloth (e.g., blue jean pants) five times or more. The mean values being smaller indicate that the user's fingerprint visibility and wipability are reduced.

Comparison Example 1 represents an example of having coated the reinforced glass with the AF, and the fingerprint visibility and the fingerprint wipability are about 21.3 and about 18.07, respectively, according to $\Delta E^*_{ab}$.

Comparison Example 2 represents an example of having coated the reinforced glass with the first coat layer, and the fingerprint visibility and the fingerprint wipability are about 1.12 and about 0.54, respectively, according to $\Delta E^*_{ab}$.

Comparison Example 3 represents an example of having coated the reinforced glass with the AS, and the fingerprint visibility and the fingerprint wipability are about 5.32 and about 8.51, respectively, according to $\Delta E^*_{ab}$.

According to an embodiment, it can be verified that upon coating the reinforced glass with the first coat layer and the second coat layer (e.g., AS processing), the fingerprint visibility and the fingerprint wipability are about 1.16 and about 0.22, respectively, according to $\Delta E^*_{ab}$.

According to an embodiment, the cover glass has the first coat layer and the second coat layer and may thus present enhanced anti-fingerprint characteristics and fingerprint wipability characteristics due to light scattering by the coat layers.

According to an embodiment, a cover glass may include a glass plate forming at least a portion of an electronic device and a first coat layer disposed on a surface of the glass plate and, at least partially, forming a network structure, wherein the first coat layer may include silicon (Si), oxygen (O), and at least one impurity, and such that Si—O bonds are 80 weight % or more of the first coat layer.

According to an embodiment, the first coat layer may present a hardness of at least 2200 MPa by thermal processing.

According to an embodiment, the network structure of the first coat layer may have a protrusion-and-depression shape with a predetermined pitch along a lengthwise direction and a predetermined height along a direction perpendicular to the lengthwise direction, and the pitch of the protrusion-and-depression shape may have a value ranging from 20 μm to 60 um, and the height of the protrusion-and-depression shape has a value ranging from 0.5 μm to 0.9 μm.

According to an embodiment, the network structure of the first coat layer may have a protrusion-and-depression shape with a predetermined pitch along a lengthwise direction and a predetermined height along a direction perpendicular to the lengthwise direction, and the ratio of the height to the pitch may range from 0.004 to 0.015.

According to an embodiment, the first coat layer may have a degree of haze ranging from 5% to 35% and a transmittance percentage of 91% or less.

According to an embodiment, the network structure of the first coat layer may include the protrusion-and-depression shape with a predetermined roughness value, and a surface roughness (Ra) of the first coat layer may have a value ranging from 100 nm to 300 nm, or a root mean square (RMS) roughness of the first coat layer may have a value ranging from 130 nm to 400 nm.

According to an embodiment, the first coat layer may include a protrusion-and-depression shape with a predetermined thickness, the protrusion-and-depression shape may include a valley portion where the first coat layer is positioned lower than a surface contacting the glass plate and a peak portion where the first coat layer is positioned higher than the contacting surface; additionally, the valley portion may have a value ranging from 300 nm to 600 nm, and the peak portion has a value ranging from 0.6 μm to 2 μm.

According to an embodiment, the cover glass may further include a second coat layer disposed on a surface of the first coat layer and deposited in a shape corresponding to the network structure of the first coat layer, and the second coat layer may include a fluorine chain or a hydrocarbon chain.

According to an embodiment, the second coat layer may provide fingerprint visibility, and $\Delta E^*_{ab}$ may be four or less according to Equation 1 below:

$$\Delta E^*_{ab} = \sqrt{(L^*_2 - L^*_1)^2 + (a^*_2 - a^*_1)^2 + (b^*_2 - b^*_1)^2}$$ [Equation 1]

such that $L^*_1$ is a brightness value before being processed with the second coat layer, $L^*_2$ is a brightness value after being processed with the second coat layer, $a^*_1$ is a color value before being processed with the second coat layer, $a^*_2$ is a color value after being processed with the second coat layer, $b^*_1$ is a chroma value before being processed with the second coat layer, and $b^*_2$ is a chroma value after being processed with the second coat layer. According to an embodiment, the second coat layer may have a transparent material and be smaller in thickness than the first coat layer.

According to an embodiment, an electronic device may include a housing including a front cover facing in a first direction and a rear cover facing in a second direction opposite to the front cover, the housing having a transparent area forming at least part of the front cover, a battery disposed inside the housing, and a display device disposed in the housing and including a screen area exposed through the front cover. The rear cover may include a glass plate, a first coat layer disposed on a surface of the glass plate and at least partially forming a network structure, and a second coat layer disposed on a surface of the first coat layer and deposited in a shape corresponding to the network structure of the first coat layer.

According to an embodiment, the method for manufacturing a cover glass of an electronic device, which includes a network structure, may include:

preparing a glass plate, disposing(ex, depositing) a first coat layer on the surface of the glass plate by applying in a wet spraying scheme and hardening multiple times, and disposing(ex, depositing) a second coat layer on the surface of the first coat layer.

According to an embodiment, in disposing the first coat layer, the weight % ratio of polysilazane to a solvent in a coating solution provided in the wet spraying scheme may be 5:95 to 20:80, and the percentage at which the coating solution arrives at a surface of the glass plate may be 40%.

According to an embodiment, in disposing the first coat layer, the coating solution applied to prepare the first coat layer may contain 1 weight % to 30 weight % of inorganic polysilazane with a weight-average molecular weight meeting Chemical formula 1 below and ranging from 2,000 to 30,000, and may be deposited on the glass plate in the wet spraying scheme:

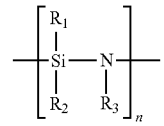

[Chemical formula 1]

such that R1, R2, and R3 are independently hydrogen, an alkyl group, an alkenyl group, a cycloalkyl group, an aryl group, a group attached to silicon, an alkylsilyl group, an alkylamino group, and an alkoxy group, and n is a positive integer.

According to an embodiment, disposing the first coat layer may include, after applying the coating solution in the wet spraying scheme, thermal drying, first hardening, and second hardening. The thermal drying may be performed in a temperature range of 50° C. to 200° C. for 2 min. to 20 min. in order to remove the solvent from the coating solution.

According to an embodiment, in the first hardening, the inorganic polysilazane may be turned into an SiO2 film by overheated steam, and the temperature of the process may range from 100° C. to 300° C.

According to an embodiment, in the second hardening, Si—N bonds and Si—H bonds remaining after the first hardening may be broken and turned into Si—O—Si bonds, and the temperature of the process may range from 30° C. to 200° C.

According to an embodiment, the second hardening may include peroxide processing, and the first coat layer subjected to the second hardening may exhibit a hardness of at least 2,200 MPa.

According to an embodiment, the first coat layer subjected to the second hardening may have a degree of haze ranging from 5% to 35% and a transmittance percentage of 91% or less at a light wavelength of 550 nm.

According to an embodiment, in disposing the second coat layer, the second coat layer may have a shape corresponding to the network structure of the first coat layer and have a carbon fluoride chain or a hydrocarbon chain.

As is apparent from the foregoing description that, according to an embodiment, in a cover glass and an electronic device with the cover glass, a polysilazane-applied coat is laid over one surface of the reinforced glass plate, thereby providing an elegant haze glass cover.

According to an embodiment, in a cover glass and an electronic device with the cover glass, a polysilazane-applied coat of the cover glass may provide an anti-fingerprint effect by scattering light.

According to an embodiment, the method for manufacturing cover glasses may impart increased hardness and chemical-durability to the coat formed on the glass plate by multiple hardening processes under predetermined conditions.

It is apparent to one of ordinary skill in the art that the camera components, according to various embodiments as described above, are not limited to the above-described embodiments and those shown in the drawings, and various changes, modifications, or alterations may be made thereto without departing from the disclosure.

What is claimed is:

1. A cover glass included in a rear cover for an electronic device, comprising:
    a glass plate forming at least a portion of the electronic device; and
    a first coat layer disposed on a surface of the glass plate, the first coat layer at least partially including a network structure with multiple protrusion-and-depression shapes formed by inorganic polysilazane coated on the surface of the glass plate, wherein the first coat layer has a hazing exceeding 5% and a transmittance of less than 91%, the first coat layer being steam hardening-processed in a temperature range of 100° C. to below 200° C. for a time range of 30 minutes to 120 minutes during a first hardening step, and processed with peroxide in a temperature range at 30° C. to 200° C. for three hours during a second hardening step after the first hardening step,
    a second coat layer disposed on a surface of the first coat layer and including a shape corresponding to the network structure of the first coat layer,
    wherein the first coat layer includes silicon (Si), oxygen (O), and at least one impurity,
    wherein Si—O bonds are at least 80% by-weight of mass of the first coat layer, and
    wherein the hazing denotes a state in a middle of changing from transparent to opaque depending on a percent of the hazing,
    wherein the multiple protrusion-and-depression shapes includes a plurality of valley portions and peak portions,
    wherein the plurality of valley portions have a thickness ranging from 300 nm to 600 nm, and the peak portions have a thickness ranging from 0.6 μm to 2 μm, and
    wherein a thickness of the first coat layer is implemented in a range of a thickness of the plurality of valley portions and a thickness of the peak portions so that a degree of the hazing is not lowered.

2. The cover glass of claim 1, wherein the first coat layer is hardened to at least 2200 MPa by thermal processing.

3. The cover glass of claim 2, wherein the network structure of the first coat layer includes:
    the multiple protrusion-and-depression shapes including a predetermined pitch along a lengthwise direction, and a predetermined height along a direction perpendicular to the lengthwise direction, and
    wherein the predetermined pitch of the multiple protrusion-and-depression shapes ranges from 20 μm to 60 um, and a height of the multiple protrusion-and-depression shapes ranges from 0.5 μm to 0.9 μm.

4. The cover glass of claim 2, wherein the network structure of the first coat layer includes the multiple protrusion-and-depression shapes with a predetermined pitch along a lengthwise direction, and a predetermined height along a direction perpendicular to the lengthwise direction, and
    wherein a ratio of the predetermined height to the predetermined pitch ranges from 0.004 to 0.015.

5. The cover glass of claim 3, wherein the first coat layer includes hazing less than 35%.

6. The cover glass of claim 3, wherein the network structure of the first coat layer including the multiple protrusion-and-depression shapes generate a surface roughness, and
    wherein a surface roughness average (Ra) of the first coat layer has a value ranging from 100 nm to 300 nm, or a root mean square (RMS) roughness of the surface roughness of the first coat layer has a value ranging from 130 nm to 400 nm.

7. The cover glass of claim 2,
    wherein the second coat layer includes a fluorine chain or a hydrocarbon chain.

8. The cover glass of claim 7, wherein the second coat layer is configured to provide anti-fingerprint visibility, and wherein ΔE*ab is four or less according to Equation 1 below:

$$\Delta E^*_{ab} = \sqrt{(L^*_2 - L^*_1)^2 + (a^*_2 - a^*_1)^2 + (b^*_2 - b^*_1)^2}$$ [Equation 1]

wherein $L^*1$ is a brightness value before processed with the second coat layer, $L^*2$ is a brightness value after processed with the second coat layer, $a^*1$ is a color value before processed with the second coat layer, $a^*2$ is a color value after processed with the second coat layer, $b^*1$ is a chroma value before processed with the second coat layer, and $b^*2$ is a chroma value after processed with the second coat layer.

9. The cover glass of claim 7, wherein the second coat layer includes a transparent material and formed in a thickness slimmer than a thickness of the first coat layer.

10. An electronic device, comprising:
    a housing including a front cover facing in a first direction and a rear cover facing in a second direction which is opposite to the first direction, the housing having a transparent area forming at least part of the front cover;
    a battery disposed within the housing; and
    a display device disposed within the housing and including a screen area exposed through the front cover, wherein the rear cover includes:
        a glass plate,
        a first coat layer disposed on a surface of the glass plate, the first coat layer at least partially including a network structure with multiple protrusion-and-depression shapes formed by inorganic polysilazane coated on the surface of the glass plate, wherein the first coat layer has a hazing exceeding 5% and a transmittance of less than 91%, the first coat layer being steam hardening-processed in a temperature range of 100° C. to below 200° C. for a time range of 30 minutes to 120 minutes during a first hardening step, and processed with peroxide in a temperature range at 30° C. to 200° C. for three hours during a second hardening step after the first hardening step,
        a second coat layer disposed on a surface of the first coat layer and including a shape corresponding to the network structure of the first coat layer,
        wherein the hazing denotes a state in a middle of changing from transparent to opaque depending on a percent of the hazing,
        wherein the multiple protrusion-and-depression shapes includes a plurality of valley portions and peak portions, wherein the plurality of valley portions have a thickness ranging from 300 nm to 600 nm, and the peak portions have a thickness ranging from 0.6 μm to 2 μm, and wherein a thickness of the first coat layer is implemented in a range of a thickness of the plurality of valley portions and a thickness of the peak portions so that a degree of the hazing is not lowered.

11. A method for manufacturing a cover glass of an electronic device, the method comprising:

preparing a glass plate;

wet spraying a first coat layer, the first coat layer at least partially including a network structure with multiple protrusion-and-depression shapes formed by inorganic polysilazane coated on a surface of the glass plate, wherein the first coat layer has a hazing exceeding 5% and a transmittance of less than 91%, on a surface of the prepared glass plate;

stream hardening the first coat layer in a temperature range of 100° C. to below 200° C. for a time range of 30 minutes to 120 minutes;

processing the stream hardened first coat layer with peroxide in a temperature range at 30° C. to 200° C. for three hours; and depositing a second coat layer on a surface of the first coat layer, the second coat layer including a shape corresponding to the network structure of the first coat layer;

wherein the first coat layer includes silicon (Si), oxygen (O), and at least one impurity, wherein Si—O bonds are at least 80% by-weight of mass of the first coat layer, and wherein the hazing denotes a state in a middle of changing from transparent to opaque depending on a percent of the hazing, wherein the multiple protrusion-and-depression shapes includes a plurality of valley portions and peak portions, wherein the plurality of valley portions has a thickness ranging from 300 nm to 600 nm, and the peak portions have a thickness ranging from 0.6 μm to 2 μm, and wherein a thickness of the first coat layer is implemented in a range of a thickness of the plurality of valley portions and a thickness of the peak portions so that a degree of the hazing is not lowered.

12. The method of claim 11, wherein the inorganic polysilazane has a weight percentage ratio by mass of polysilazane to a solvent in a coating solution ranges from 5:95 to 20:80, and wherein a percentage at which the coating solution arrives at a surface of the glass plate is 40%.

13. The method of claim 12, wherein the coating solution includes 11% to 30% by-weight % of inorganic polysilazane with a weight-average molecular weight according with chemical formula 1 below, the molecular weight ranges from 2,000 to 30,000, and the coating solution is deposited on the glass plate:

[Chemical formula 1]

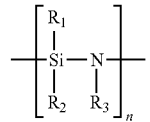

wherein R1, R2, and R3 include independently one or more of hydrogen, an alkyl group, an alkenyl group, cycloalkyl group, aryl group, a group attached to silicon, alkylsilyl group, alkylamino group, and an alkoxy group, and n is a positive integer.

14. The method of claim 11, wherein processing the stream hardened first coat layer further comprises, breaking down Si—N bonds and Si—H bonds that remain after steam hardening and transforming the Si—N bonds and Si—H into Si—O—Si bonds.

15. The method of claim 11, wherein the first coat layer after processing has a hardness of at least 2,200 MPa.

16. The method of claim 11, wherein after depositing the second coat layer, the second coat layer includes a carbon fluoride chain or a hydrocarbon chain.

17. The electronic device of claim 10, wherein the first coat layer includes silicon (Si), oxygen (O), and at least one impurity, and wherein Si—O bonds are at least 80% by-weight of mass of the first coat layer.

* * * * *